(12) United States Patent
Depaola

(10) Patent No.: US 7,190,636 B1
(45) Date of Patent: Mar. 13, 2007

(54) DIVING SUIT AND ENVIRONMENTAL DETECTING SYSTEM

(76) Inventor: Victor R. Depaola, 40 Woodland St., Lake Ronkonkumm, NY (US) 11779

( * ) Notice: Subject to any disclaimer, the term of this patent is extended or adjusted under 35 U.S.C. 154(b) by 195 days.

(21) Appl. No.: 11/065,660

(22) Filed: Feb. 25, 2005

(51) Int. Cl.
*H04B 11/00* (2006.01)

(52) U.S. Cl. .................................................... 367/131

(58) Field of Classification Search ................ 367/131, 367/118

See application file for complete search history.

(56) References Cited

U.S. PATENT DOCUMENTS

| | | |
|---|---|---|
| 3,784,805 A | 1/1974 | Rolle |
| 3,800,273 A | 3/1974 | Rolle |
| 5,033,818 A | 7/1991 | Barr |
| 5,293,351 A | 3/1994 | Noponen |
| 5,301,668 A | 4/1994 | Hales |
| 5,535,053 A | 7/1996 | Baril et al. |
| 6,501,704 B2 * | 12/2002 | Nishimura .................. 367/130 |

* cited by examiner

*Primary Examiner*—Dan Pihulic

(57) ABSTRACT

A diving suit and environmental detecting system includes a diving suit and aspirating assembly includes a torso portion, a first arm portion, a second arm portion, a first leg portion, a second leg portion, a head covering, a first glove, a facemask, a second glove and an air tank. A housing is mounted on the first glove. A display is mounted in the facemask. A processor is positioned within the housing and is electrically coupled to the display. The processor is adapted for receiving a plurality of input signals and altering the display based upon the input signals. A power supply is mounted on the diving suit and is electrically coupled to the processor. A locating assembly is electrically coupled to the processor and is adapted for determining a location of the diving suit with respect to a trasmitter and displaying the location on the display.

16 Claims, 5 Drawing Sheets

FIG.2
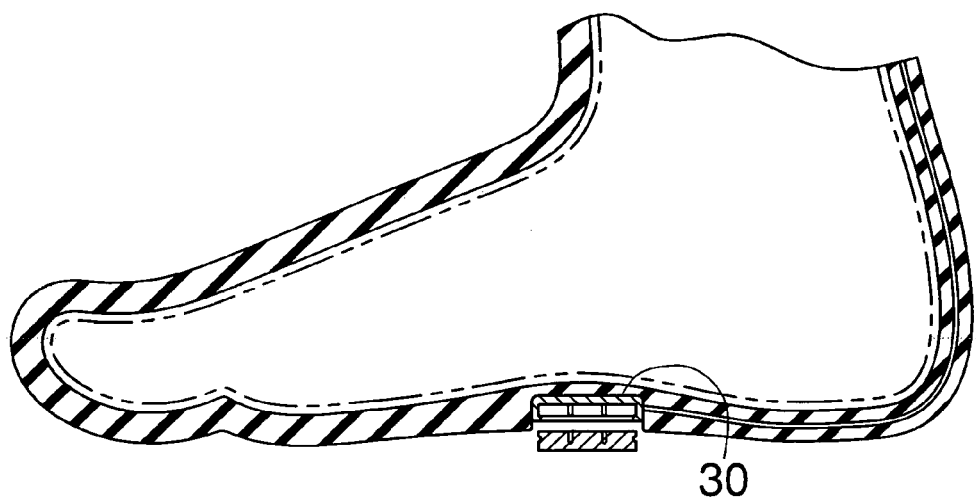
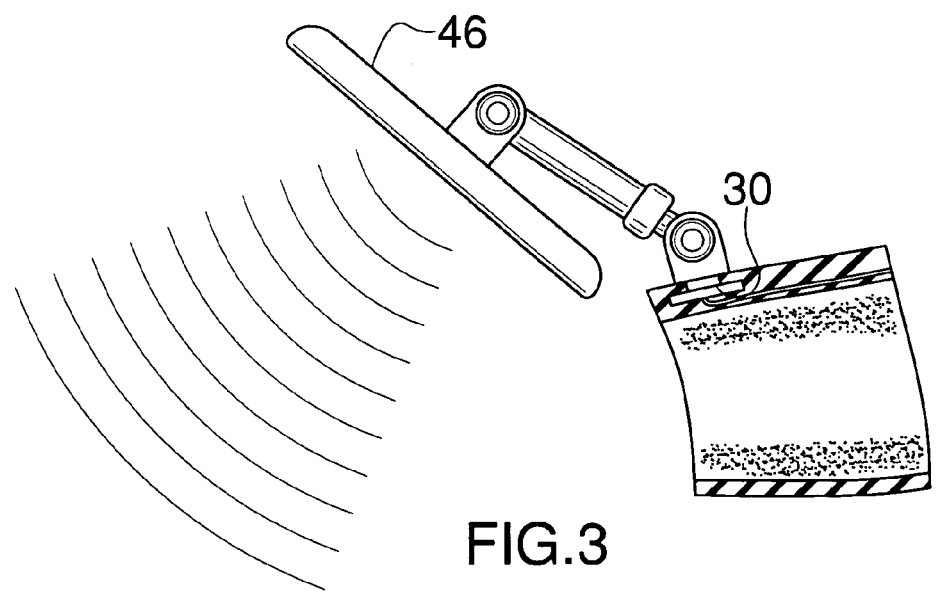
FIG.3

DIVING SUIT AND ENVIRONMENTAL DETECTING SYSTEM

BACKGROUND OF THE INVENTION

1. Field of the Invention

The present invention relates to diving suit devices and more particularly pertains to a new diving suit device which displays a location of the diving suit with respect to a boat, or submersible pod transducer, within a mask of a diver and which includes a plurality of plugs for attaching any of a plurality of sensors to the diving suit.

2. Description of the Prior Art

The use of diving aids is known in the prior art. U.S. Pat. No. 5,301,668 describes a device which includes a viewing display that is projected onto a surface of a diver's mask. Another type of diving aid is U.S. Pat. No. 5,293,351 which includes an acoustic searching device which allows a person to use ultrasound to display an image in a diver's mask. Yet another such device is found in U.S. Pat. No. 5,033,818 and includes a LED display which is projected on a diver's mask. U.S. Pat. No. 5,535,053 describes a night vision assembly for viewing objects in a low light environment.

While these devices fulfill their respective, particular objectives and requirements, the need remains for a diving suit that includes a plurality of plugs mounted therein which are each electrically coupled to a processor on a the diving suit which will permit a user of the diving suit to selectively couple sensors to the plug. This will allow a wearer of the suit to tailor the diving suit to their needs.

SUMMARY OF THE INVENTION

The present invention meets the needs presented above by generally comprising a diving suit and aspirating assembly includes a torso portion, a first arm portion, a second arm portion, a first leg portion, a second leg portion, a head covering, a first glove, a facemask, a second glove and an air tank. A housing is mounted on the first glove. A display is mounted in the facemask. A processor is positioned within the housing and is electrically coupled to the display. The processor is adapted for receiving a plurality of input signals and altering the display based upon the input signals. A power supply is mounted on the diving suit and is electrically coupled to the processor. A locating assembly is electrically coupled to the processor and is adapted for determining a location of the diving suit with respect to a transmitter mounted on a boat or submersible pod transducer and displaying the location on the display.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a cross-sectional view of a foot portion of a diving suit of the present invention.

FIG. 3 is a cross-sectional view of an arm portion of the diving suit of the present invention.

DESCRIPTION OF THE PREFERRED EMBODIMENT

Figure 1:
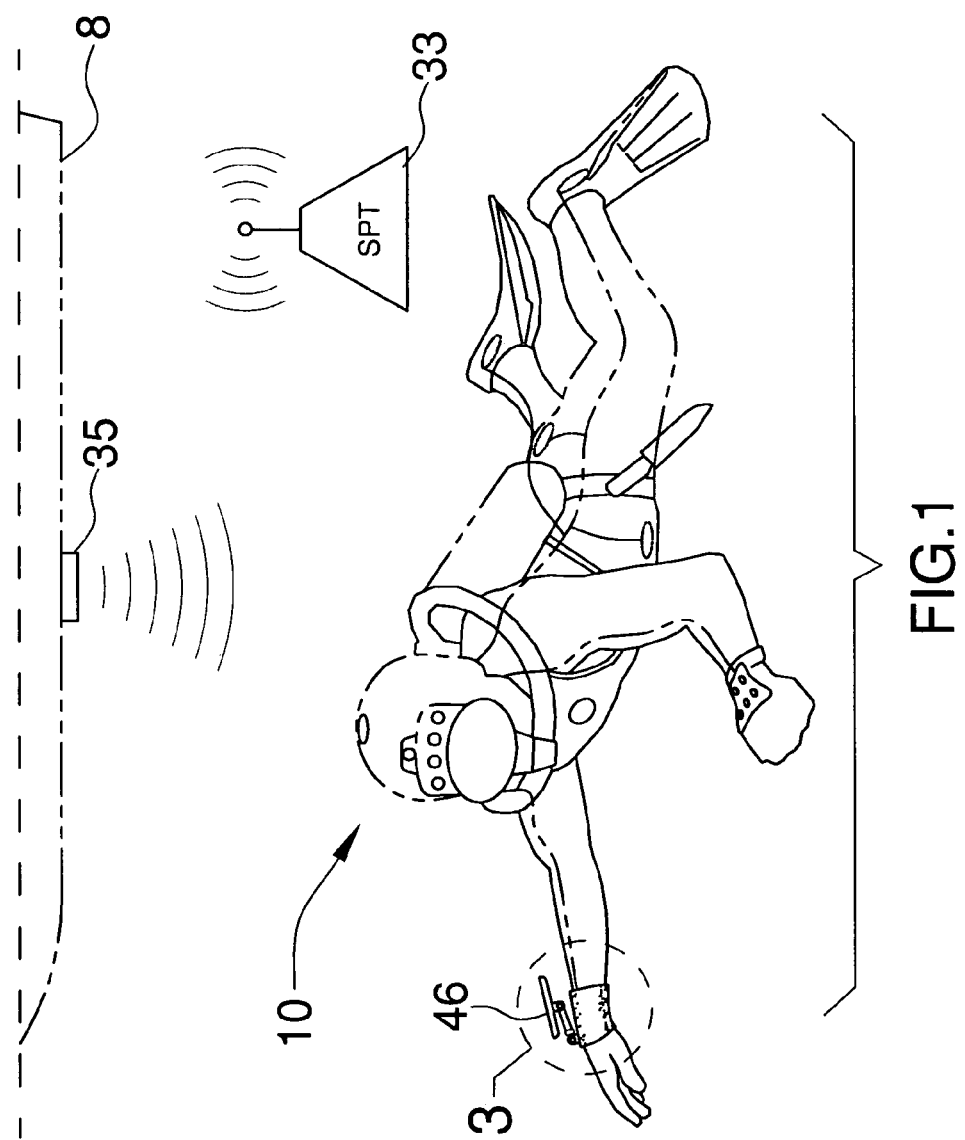
FIG. 1 is an in-use view of a diving suit and environmental detecting system according to the present invention.
Figure 4:
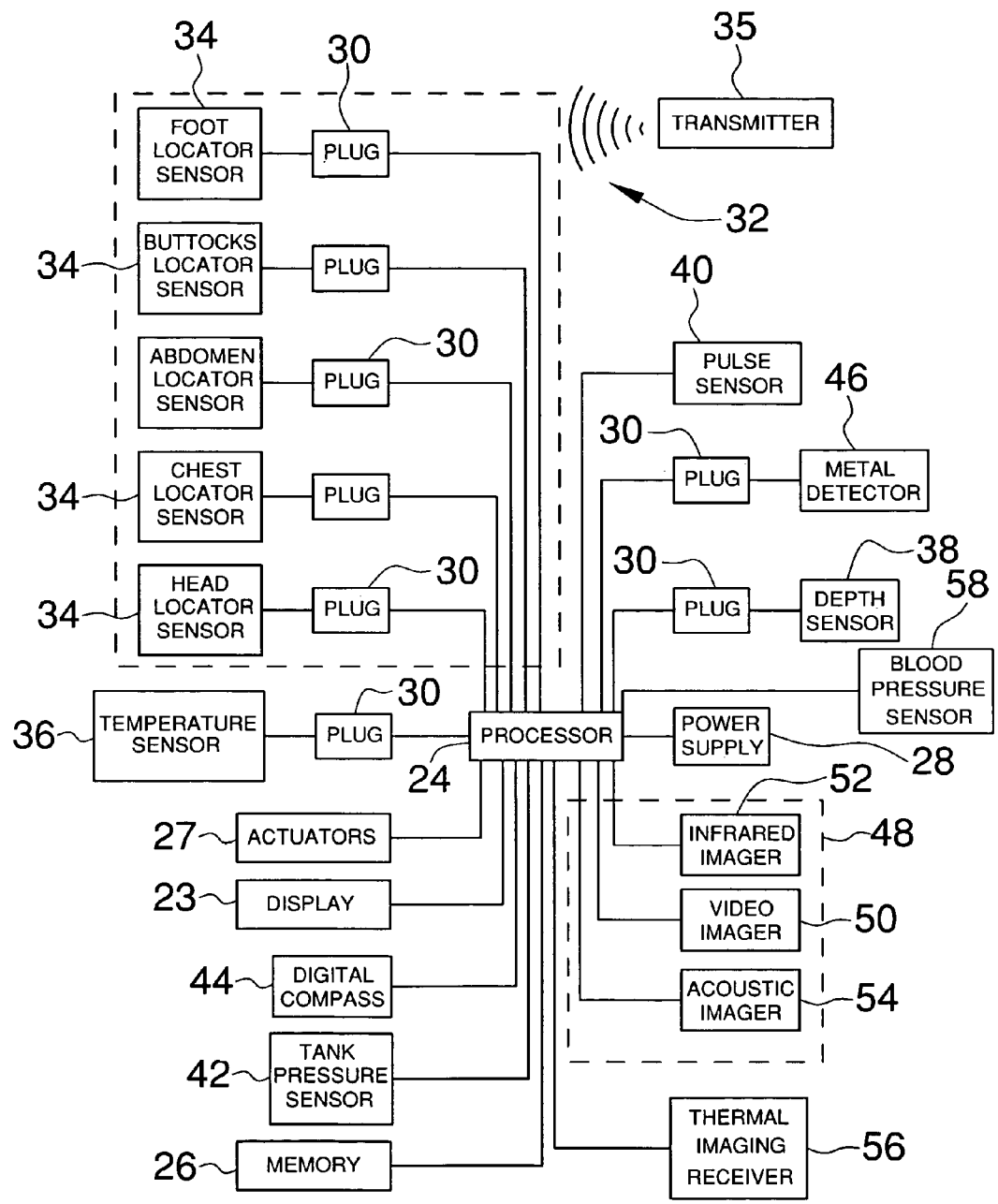
FIG. 4 is a schematic view of the present invention.
Figure 5:
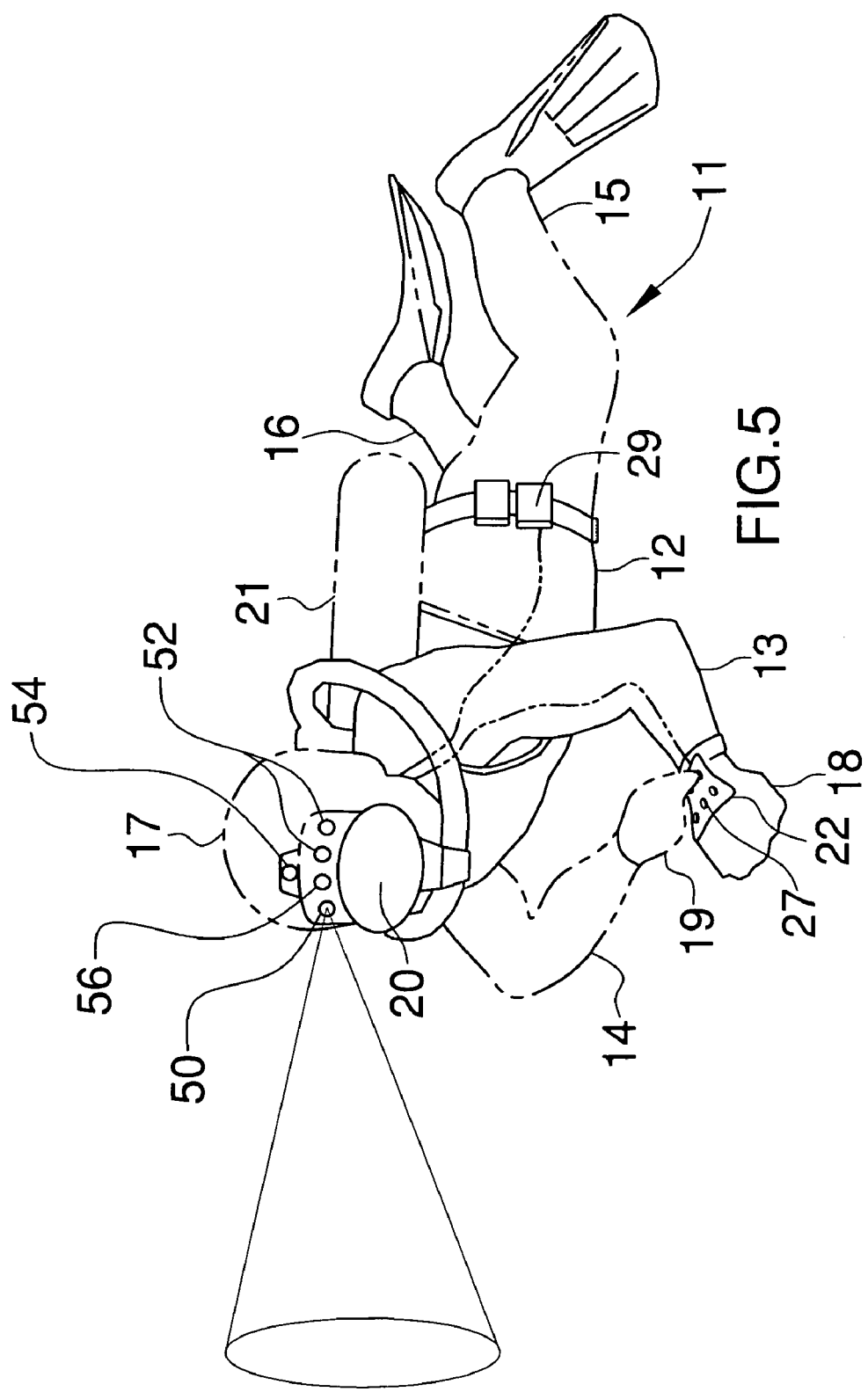
FIG. 5 is an in-use side view of the present invention.

With reference now to the drawings, and in particular to FIGS. 1 through 6 thereof, a new diving suit device embodying the principles and concepts of the present invention and generally designated by the reference numeral 10 will be described.

Figure 6:
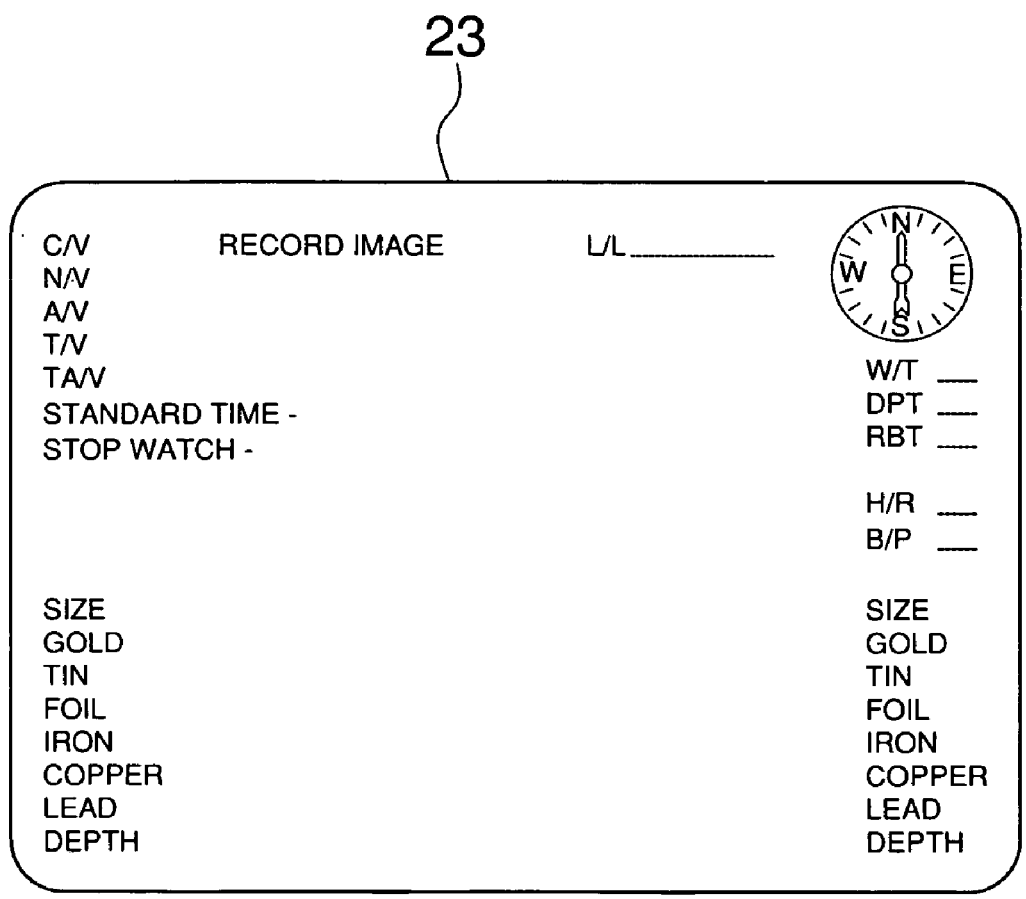
FIG. 6 is a front view of a display of the present invention.

As best illustrated in FIGS. 1 through 6, the diving suit and environmental detecting system 10 generally comprises a diving suit 11 and aspirating assembly of generally conventional construction wherein the diving suit 11 includes a torso portion 12, a first arm portion 13, a second arm portion 14, a first leg portion 15, a second leg portion 16, a head covering 17, a first glove 18, a second glove 19, a facemask 20 and at least one air tank 21. A housing 22 is mounted on the first glove 18 and a display 23 is mounted in the facemask 19. The display 23 may either be a projected display or a LCD type display mounted in the facemask 20. An example of the display 23 is shown in FIG. 6. A processor 24 is positioned within the housing 22. The processor 24 is electrically coupled to the display 23 by wires extending throughout the diving suit. The processor 24 is adapted for receiving a plurality of input signals and altering the image displayed by the display 23 based upon the input signals. The processor 24 at least includes a chronometer for tracking a selected amount of time that is then displayed on the display 23.

An electronic memory means 26 is electrically coupled to the display 23 for selectively recording images displayed on the display 23. The electronic memory means 26 is preferably positioned in the housing 22 and includes conventional recording means such as RAM or disc recording medium. A plurality of input actuators 27 is mounted on the housing 22 and each is electrically coupled to the processor 24. The input actuators 27 may be used for selectively turning the memory means 26 on in a recording function and for starting the chronometer of the processor 24 in a stopwatch mode.

A power supply 28 is mounted on the diving suit 11 and is electrically coupled to the processor 24. The power supply 28 preferably includes a plurality of batteries 29 that are mounted on the suit 11. The batteries 29 are preferably conventional lead batteries, which are also used to replace the weight of lead weights which divers typically use to aid buoyancy.

A plurality of plugs 30 is mounted in the diving suit 11. Each of the plugs 30 is electrically coupled to the processor 24 by wires which are extended throughout the diving suit 11. This allows for the plugs 30 to be positioned in a variety of places and also allows for a plurality of devices to be plugged into the processor 24 and power supply 28.

A locating assembly 32 is electrically coupled to the processor 24 and is adapted for determining a location of the diving suit 11 with respect to a boat 8 and displaying the location on the display 23. The locating assembly 32 includes a plurality of location sensors 34 each including a receiver. Each of the location sensors 34 is coupled to one of the plugs 30. A transmitter 35 is mounted on the boat 8, or submersible transducer 33, for sending wireless signals to the location sensors 34. By using at least one pair of location sensors 34, positioned in known place on the suit 11, the processor 24 can triangulate the location of the suit 11 with respect to the transmitter 35. For this reason, it is preferred that location sensors 34 are placed in areas such as the buttocks, abdomen, feet and chest. However, a secondary transmitter or transducer 33 mounted on a submersible may aid in this process. A transmitter may be electrically coupled to processor 24 for transmitting location, as well as any other information being processed by the processor 24, to a receiver on the boat 8.

A temperature sensor 36 adapted for determining ambient temperature and displaying the temperature on the display 23 is removably coupled to one of the plugs 30. A depth sensor 38 adapted for determining a depth of the diving suit 11 and displaying the depth on the display 23 is also coupled to one of the plugs 30.

A pulse sensor 40 is positioned in the torso portion 12 of the diving suit 11 and is electrically coupled to the processor 24. The pulse sensor 40 is adapted for determining a heart rate of a person wearing the diving suit 11 and displaying the heart rate on the display 23. An air pressure sensor 42 is operationally coupled to the air tank 21 and is electrically coupled to the processor 24. The air pressure sensor 42 is adapted for measuring an air pressure of the air tank 21 and the air pressure is displayed on the display 23. A blood pressure sensor 58 is electrically coupled to the processor and is adapted for determining the blood pressure of a person wearing the diving suit 11 and displays the blood pressure on the display 23. The processor calculates the amount of dive time remaining and displays this based on the readings from the air pressure sensor 42 and depth sensor 38.

A directional sensor 44 is mounted in the housing 22 and is electrically coupled to the processor 24. The directional sensor 44 is adapted for determining a direction and displaying the direction on the display 23. The directional sensor 44 is preferably a digital compass.

A metal detecting sensor 46 is coupled to one of the plugs 30 and is adapted for detecting metallic objects. Metal detection indicia are displayed on the display 23 when the metal detecting sensor 46 detects a metallic object. The metal detecting sensor 46 preferably includes a conventional metal detector that is adapted for differentiating between a plurality of types of metal.

An imaging assembly 48 is electrically coupled to the processor 24. The imaging assembling 48 includes a plurality of imagers for viewing objects in a variety of underwater conditions. The images captured by the imagers may be selectively displayed on the display 23 and recorded on the memory means 26. A video imager 50 includes a camera adapted for viewing visible light. The video imager 50 is adapted for displaying the visible light and is mounted on the head covering 17 which may be attached to the mask 20. An infrared imager 52 includes an infrared light emitter and an infrared detecting camera. The infrared imager 52 is adapted for converting reflected infrared light into visible light and displaying the visible light on the display 23. The infrared imager 52 is mounted on the head covering 17. The infrared imager 52 may be of particular use during dark conditions when a diver does not wish to use visible light from a conventional light source. An acoustic imager 54 includes a sonar assembly and is adapted for emitting sound waves and detecting the sound waves when the sound waves are reflected off of an object. The acoustic imager 54 is adapted for forming an image of the object and displaying the object on the display. The acoustic imager 54 is mounted on the head covering 17. A thermal imaging receiver 56 detects heat sources in relation to underwater terrain in front of a diver and forms images of those sources, which is shown on the display 23.

In use, a person wears and uses the diving suit 11 in a conventional manner. However, the various sensors and the imaging assembly 48 provide the processor 24 with additional information regarding the person's surroundings, which can be displayed on the display. The plugs 30 allow the diving suit 11 to incorporate new and different sensors as they are developed. The processor 24 may be any conventional processor that may be programmed as needed to process the information signals from the sensors and the imaging assembly 48. The input actuators 27 may be actuated as needed for selectively turning on or off each of the sensors and the imagers. The diver may change the display to show where thermal or acoustically detected objects are with respect to the suit and may also triangulate the suit's position with respect to those objects by knowing the locations of the object, the boat, the suit and the submersible. This will allow a diver to see themselves on the display swimming by or through objects.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A diving suit and environmental detecting combination comprising:
   a diving suit and aspirating assembly including a torso portion, a first arm portion, a second arm portion, a first leg portion, a second leg portion, a head covering, a first glove, a facemask, a second glove and an air tank;
   a housing being mounted on said first glove;
   a display being mounted in said facemask;
   a processor being positioned within said housing, said processor being electrically coupled to said display, said processor being adapted for receiving a plurality of input signals and altering said display based upon said input signals;
   a power supply being mounted on said diving suit and being electrically coupled to said processor;
   a locating assembly being electrically coupled to said processor and being adapted for determining a location of said diving suit with respect to a transmitter and displaying said location on said display.

2. The diving suit and environmental detecting combination according to claim 1, wherein said processor includes a chronometer for tracking a selected amount of time, said selected amount of time being displayed on said display.

3. The diving suit and environmental detecting combination according to claim 1, further including:

a plurality of plugs being mounted in said diving suit, each of said plugs being electrically coupled to said processor;

said locating assembly including;
a plurality of location sensors each including a receiver, each of said location sensors being coupled to one of said plugs; and
said transmitter being adapted for sending wireless signals to said receivers.

4. The diving suit and environmental detecting combination according to claim 3, further including a temperature sensor adapted for determining ambient temperature and displaying said temperature on said display, said temperature sensor being coupled to one of said plugs.

5. The diving suit and environmental detecting combination according to claim 3, further including a depth sensor adapted for determining a depth of said diving suit and displaying said depth on said display, said depth sensor being coupled to one of said plugs.

6. The diving suit and environmental detecting combination according to claim 3, further including a pulse sensor being positioned in said torso portion and electrically coupled to said processor, said pulse sensor being adapted for determining a heart rate of a person wearing said diving suit and displaying said heart rate on said display.

7. The diving suit and environmental detecting combination according to claim 3, further including an air pressure sensor being operationally coupled to said air tank and electrically coupled to said processor, said air pressure sensor being adapted for measuring an air pressure of the air tank, said air pressure being displayed on said display.

8. The diving suit and environmental detecting combination according to claim 3, further including a directional sensor being mounted in said housing and being electrically coupled to said processor, said directional sensor being adapted for determining a direction and displaying said direction on said display.

9. The diving suit and environmental detecting combination according to claim 3, further including a metal detecting sensor being coupled to one of said plugs and being adapted for detecting metallic objects, wherein metal detection indicia is displayed on said display when said metal detecting sensor detects a metallic object.

10. The diving suit and environmental detecting combination according to claim 1, further including an imaging assembly being electrically coupled to said processor, said imaging assembling including a video imager including a camera adapted for viewing visible light, said video imager being adapted for displaying said visible light on said display, said video imager being mounted on said head covering.

11. The diving suit and environmental detecting combination according to claim 10, wherein said imaging assembly further includes an infrared imager including an infrared light emitter and an infrared detecting camera, said infrared imager being adapted for converting reflected infrared light into visible light and displaying the visible light on said display, said infrared imager being mounted on said head covering.

12. The diving suit and environmental detecting combination according to claim 11, wherein said imaging assembly further includes an acoustic imager including a sonar, said acoustic imager being adapted for emitting sound waves and receiving said sound waves when said sound waves are reflected off of an object, said acoustic imager being adapted for forming an image of the object and displaying said object on said display, said acoustic imager being mounted on said head covering.

13. The diving suit and environmental detecting combination according to claim 11, wherein said imaging assembly further includes a thermal imaging receiving adapted for detecting thermal variants in an underwater terrain, said thermal imager being adapted for forming an image of the thermal variant and displaying said thermal variant on said display, said thermal variant being mounted on said head covering.

14. The diving suit and environmental detecting combination according to claim 1, further including an imaging assembly being electrically coupled to said processor, said imaging assembling including an acoustic imager including a sonar, said acoustic imager being adapted for emitting sound waves and receiving said sound waves when said sound waves are reflected off of an object, said acoustic imager being adapted for forming an image of the object and displaying said object on said display, said acoustic imager being mounted on said head covering.

15. The diving suit and environmental detecting combination according to claim 3, further including a blood pressure sensor being positioned in said torso portion and electrically coupled to said processor, said blood pressure sensor being adapted for determining a blood pressure of a person wearing said diving suit and displaying said blood pressure on said display.

16. A diving suit and environmental detecting combination comprising:

a diving suit and aspirating assembly including a torso portion, a first arm portion, a second arm portion, a first leg portion, a second leg portion, a head covering, a first glove, a facemask, a second glove and an air tank;

a housing being mounted on said first glove;

a display being mounted in said facemask;

a processor being positioned within said housing, said processor being electrically coupled to said display, said processor being adapted for receiving a plurality of input signals and altering said display based upon said input signals, said processor including a chronometer for tracking a selected amount of time, said selected amount of time being displayed on said display;

an electronic memory means being electrically coupled to said display for selectively recording images displayed on said display;

a plurality of input actuators being mounted on said housing and being electrically coupled to said processor;

a power supply being mounted on said diving suit and being electrically coupled to said processor;

a plurality of plugs being mounted in said diving suit, each of said plugs being electrically coupled to said processor;

a locating assembly being electrically coupled to said processor and being adapted for determining a location of said diving suit with respect to a boat and displaying said location on said display, said locating assembly including;
a plurality of location sensors each including a receiver, each of said location sensors being coupled to one of said plugs;
a transmitter being mounted on the boat for sending wireless signals to said receivers;

a temperature sensor adapted for determining ambient temperature and displaying said temperature on said display, said temperature sensor being coupled to one of said plugs;

a depth sensor adapted for determining a depth of said diving suit and displaying said depth on said display, said depth sensor being coupled to one of said plugs;

a pulse sensor being positioned in said torso portion and electrically coupled to said processor, said pulse sensor being adapted for determining a heart rate of a person wearing said diving suit and displaying said heart rate on said display;

an air pressure sensor being operationally coupled to said air tank and electrically coupled to said processor, said air pressure sensor being adapted for measuring an air pressure of the air tank, said air pressure being displayed on said display;

a directional sensor being mounted in said housing and being electrically coupled to said processor, said directional sensor being adapted for determining a direction and displaying said direction on said display;

a metal detecting sensor being coupled to one of said plugs and being adapted for detecting metallic objects, wherein metal detection indicia is displayed on said display when said metal detecting sensor detects a metallic object;

an imaging assembly being electrically coupled to said processor, said imaging assembling including;

a video imager including a camera adapted for viewing visible light, said video imager being adapted for displaying said visible light on said display, said video imager being mounted on said head covering;

an infrared imager including an infrared light emitter and an infrared detecting camera, said infrared imager being adapted for converting reflected infrared light into visible light and displaying the visible light on said display, said infrared imager being mounted on said head covering;

an acoustic imager including being adapted for emitting sound waves and detecting said sound waves when said sound waves are reflected off of an object, said acoustic imager being adapted for forming an image of the object and displaying said object on said display, said acoustic imager being mounted on said head covering; and wherein said input actuators may be actuated for selectively turning on or off each of said sensors and said imagers.

* * * * *